United States Patent
Nojima (10) Patent No.: US 9,507,556 B2
(45) Date of Patent: Nov. 29, 2016

(54) SERVER, PRINT JOB CONTROL METHOD FOR THE SAME, AND RECORDING MEDIUM

(71) Applicant: Nobuhiro Nojima, Amagasaki (JP)

(72) Inventor: Nobuhiro Nojima, Amagasaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/788,378

(22) Filed: Mar. 7, 2013

(65) Prior Publication Data

US 2013/0242344 A1   Sep. 19, 2013

(30) Foreign Application Priority Data

Mar. 14, 2012  (JP) ................... 2012-058025

(51) Int. Cl.
*G06F 3/12* (2006.01)

(52) U.S. Cl.
CPC .......... *G06F 3/1296* (2013.01); *G06F 3/1219* (2013.01); *G06F 3/1263* (2013.01); *G06F 3/1288* (2013.01)

(58) Field of Classification Search
CPC .................................................. G06F 3/1296
USPC .............................................. 358/1.13–1.15
See application file for complete search history.

(56) References Cited

U.S. PATENT DOCUMENTS

| 2006/0215208 A1 | 9/2006 | Takayama | |
| 2007/0058192 A1 | 3/2007 | Carney et al. | |
| 2007/0268512 A1* | 11/2007 | Sakakibara | G06F 3/1207 358/1.14 |
| 2008/0278751 A1* | 11/2008 | Moyer et al. | 358/1.15 |
| 2011/0170128 A1* | 7/2011 | Takahashi | 358/1.13 |
| 2012/0212770 A1* | 8/2012 | Gaertner et al. | 358/1.15 |

FOREIGN PATENT DOCUMENTS

| CN | 1932747 | 3/2007 |
| CN | 102131025 | 7/2011 |
| JP | H11-296321 A | 10/1999 |

(Continued)

OTHER PUBLICATIONS

Office Action (Notification of Allowance) issued Jan. 7, 2014, by the Japanese Patent Office in corresponding Japanese Patent Application No. 2012-058025, and an English Translation of the Office Action. (6 pages).

(Continued)

*Primary Examiner* — Marivelisse Santiago Cordero
*Assistant Examiner* — Kevin Ky
(74) *Attorney, Agent, or Firm* — Buchanan Ingersoll & Rooney PC (57) ABSTRACT

A server includes a spooler which puts one or more jobs connected to one or more users in a spool queue; a user information receiver which receives from a printing apparatus, user information of a user who is logged on to the printing apparatus; a job search portion which finds one or more jobs connected to the logon user among the one or more jobs waiting in the spool queue, by using the user information received by the user information receiver; and a controller which controls such that the most recent job among the one or more jobs found by the job search portion is transferred to the printing apparatus and further controls, on the basis of one or both of: the job title of the most recent job; and the spool time the most recent job is put into the spool queue.

16 Claims, 8 Drawing Sheets

(56) References Cited

FOREIGN PATENT DOCUMENTS

| | | |
|---|---|---|
| JP | 2009-40010 A | 2/2009 |
| JP | 2009-230580 A | 10/2009 |
| JP | 2009-297990 A | 12/2009 |
| JP | 2011-020389 A | 2/2011 |

OTHER PUBLICATIONS

Official Action issued in corresponding Chinese Patent Application No. 201310078851.3; dated Jul. 23, 2015, and English translation thereof. (15 pages).

* cited by examiner

| Job No. | Job Title |
|---|---|
| 4 | abcdxxx.doc |
| 3 | abcdxxx.doc |
| 2 | abcd.doc |
| 1 | XYZ.doc |

| Job No. | Job Title | File Size |
|---------|-----------|-----------|
| 4 | ab4.doc | 50KB |
| 3 | ab3.doc | 50KB |
| 2 | ab2.doc | 51KB |
| 1 | ab1.doc | 70KB |

SERVER, PRINT JOB CONTROL METHOD FOR THE SAME, AND RECORDING MEDIUM

This application claims priority under 35 U.S.C. §119 to Japanese Patent Application No. 2012-058025 filed on Mar. 14, 2012, the entire disclosure of which is incorporated herein by reference in its entirety.

BACKGROUND OF THE INVENTION

Field of the Invention

The present invention relates to: a server to be employed in a pull printing system, which puts in a spool queue of the server, print jobs received from user terminals such as personal computers and transfers one of those in the spool queue to a printing apparatus such as an image forming apparatus to perform printing, when receiving a user's print instructions from the printing apparatus; a print job control method for the server; and a recording medium with a print job control program being stored thereon.

Description of the Related Art

The following description sets forth the inventor's knowledge of related art and problems therein and should not be construed as an admission of knowledge in the prior art.

Conventionally, when receiving a user's print instructions from a printing apparatus, such a server employed in a pull printing system as described above transferred to the printing apparatus all the print jobs connected to the user among those in a spool queue. Receiving the print jobs connected to the user, the printing apparatus had to execute them all.

Actually some of the print jobs may not be really needed for the user. For example, some of the print jobs may have been left in the spool queue because of being no longer needed or may have been put into the spool queue double for the second time by mistake and left therein without being deleted. However, the printing apparatus had to execute all the print jobs including such not really needed ones as described above, which caused a waste of copy paper, communication time, and print time.

Japanese Unexamined Patent Publication No. 2009-297990 discloses an image forming apparatus comprising a job data storage which stores authorized print jobs, the image forming apparatus being configured to display a list of a user's authorized print jobs so that the user can confirm, if a predetermined number of the user's authorized jobs or more is stored on the job storage.

Japanese Unexamined Patent Publication No. 2009-040010 discloses a network printing apparatus being configured to extract print data from a print job in a spool queue and store the print data on a user folder, if the period of time that the print job waits in the spool queue exceeds a certain standard value.

However, Japanese Unexamined Patent Publication No. 2009-297990 only discloses an image forming apparatus being configured to display a list of a user's authorized print jobs if a predetermined number or more of the user's authorized jobs is stored on the job storage, not providing a perfect solution to the problem of a waste of copy paper, communication time, and print time because the image forming apparatus still has to execute all the print jobs including not really needed ones such as those having been left in the spool queue because of being no longer needed and those having been put into the spool queue double for the second time by mistake and left therein without being deleted.

Japanese Unexamined Patent Publication No. 2009-040010 only discloses a network printing apparatus being configured to judge whether or not to store on a user folder, a print job in a spool queue depending on the length of the period of time that the print job waits in the spool queue. That is, a print job having been left in a spool queue for more than a certain period of time for some reason is automatically stored on a user folder even though it is really needed. This required users to read it out from the user folder before executing, making the user operation troublesome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a server comprising:
- a spooler which puts one or more jobs connected to one or more users in a spool queue;
- a user information receiver which receives from a printing apparatus, user information of a user who is logged on to the printing apparatus;
- a job search portion which finds one or more jobs connected to the logon user among the one or more jobs waiting in the spool queue, by using the user information received by the user information receiver; and
- a controller which controls such that the most recent job among the one or more jobs found by the job search portion is transferred to the printing apparatus and further controls, on the basis of one or both of: the job title of the most recent job; and the spool time the most recent job is put into the spool queue, such that the one or more jobs found by the job search portion, excluding the most recent job, are kept without being transferred to the printing apparatus.

A second aspect of the present invention relates to a print job control method for a server, comprising:
- putting one or more jobs connected to one or more users in a spool queue;
- receiving from a printing apparatus, user information of a user who is logged on to the printing apparatus;
- finding one or more jobs connected to the logon user among the one or more jobs waiting in the spool queue, by using the user information received from the printing apparatus; and
- controlling such that the most recent job among the one or more jobs found from the spool queue is transferred to the printing apparatus and further controlling, on the basis of one or both of: the job title of the most recent job; and the spool time the most recent job is put into the spool queue, such that the one or more jobs found from the spool queue, excluding the most recent job, are kept without being transferred to the printing apparatus.

A third aspect of the present invention relates to a non-transitory computer-readable recording medium with a print job control program being stored thereon to make a computer of a server execute:
- putting one or more jobs connected to one or more users in a spool queue;
- receiving from a printing apparatus, user information of a user who is logged on to the printing apparatus;

finding one or more jobs connected to the logon user among the one or more jobs waiting in the spool queue, by using the user information received from the printing apparatus; and controlling such that the most recent job among the one or more jobs found from the spool queue is transferred to the printing apparatus and further controlling, on the basis of one or both of: the job title of the most recent job; and the spool time the most recent job is put into the spool queue, such that the one or more jobs found from the spool queue, excluding the most recent job, are kept without being transferred to the printing apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
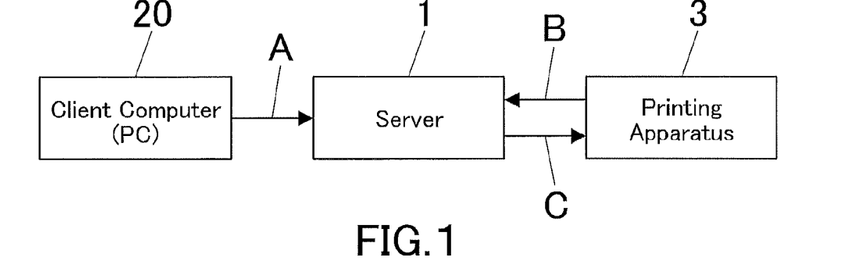
FIG. 1 illustrates a configuration of a pull printing system having a server according to one embodiment of the present invention.

FIG. 1 illustrates a configuration of a pull printing system having a server according to one embodiment of the present invention.

This pull printing system is provided with: a server 1; a client computer 2, a user terminal such as a personal computer (PC); and a printing apparatus 3, all of which are connected to each other via a network.

When hoping to print something, a user transmits a print job (also referred to simply as "job") to the server 1 by operating the client computer 2 as indicated by an arrow A. Receiving the job from the client computer 2, the sever 1 connects the job to the user (sender of the job) and put it in a spool queue stored on a memory which serves as a database.

To execute this job in the spool queue by the printing apparatus 3, the user comes to the printing apparatus 3 and logs on. Subsequently, the printing apparatus 3 transmits to the server 1, as indicated by an arrow B, the user's login information including user information and print instructions. The server 1 detects all jobs connected to the user by searching the database using the user information included in the login information, divides the detected jobs into two categories: needed and no longer needed, and then, as indicated by an arrow C, transfers only the needed jobs to the printing apparatus 3. The printing apparatus 3 performs printing in accordance with the needed jobs received therefrom.

In this embodiment, a multifunction peripheral (MFP), which is a multifunctional digital image forming apparatus having various functions such as copier, printer, facsimile, and scanner function, is employed as the printing apparatus 3.

Figure 2:
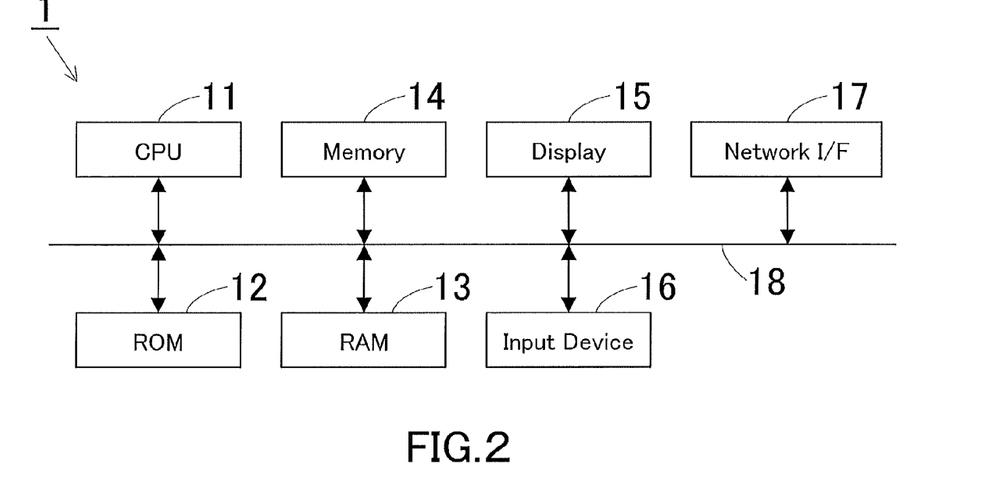
FIG. 2 is a block diagram illustrating a configuration of the server.

FIG. 2 is a block diagram illustrating a configuration of the server 1.

The server 1, consisting of a personal computer, is provided with: a CPU 11, a ROM 12, a RAM 13, a memory 14, a display 15, an input device 16, a network interface (network I/F) 17, and the like, all of which are connected to each other via a system bus 18, as illustrated in FIG. 2.

The CPU 11 controls the entire server 1 in a unified and systematic manner by executing operation programs stored on a recording medium such as the ROM 12. Specifically, in this embodiment, when receiving a user's login information from the printing apparatus 3, the CPU 11 judges whether or not there is a job connected to the user in a spool queue stored on the memory 14, and if there is, further judges whether it is needed or no longer needed. Then the CPU 11 transfers only the needed job to the printing apparatus 3. This operation will be later described in more detail.

The ROM 12 is a recording medium storing operation programs for the CPU 11 to execute processing, and other data.

The ROM 13 is a recording medium providing a work area for the CPU 11 to execute processing according to an operation program.

The memory 14, consisting of a recording medium such as a hard disk drive, stores jobs connected to users in a spool queue after receiving them from the users' clients. The memory 14 also stores various application programs and the like.

The display 15, consisting of a CRT display, a liquid-crystal display, or the like, displays various messages, entry screens, selection screens, and the like for users.

The input device 16, consisting of a keyboard, a mouse, and the like, is used by users for input operation.

The network interface 17 serves as a communication device exchanging data with external apparatuses such as the client computer 2 and the printing apparatus 3, via a network.

Hereinafter, operation of the server 1 will be described in detail with reference to FIG. 3.

Figure 3:
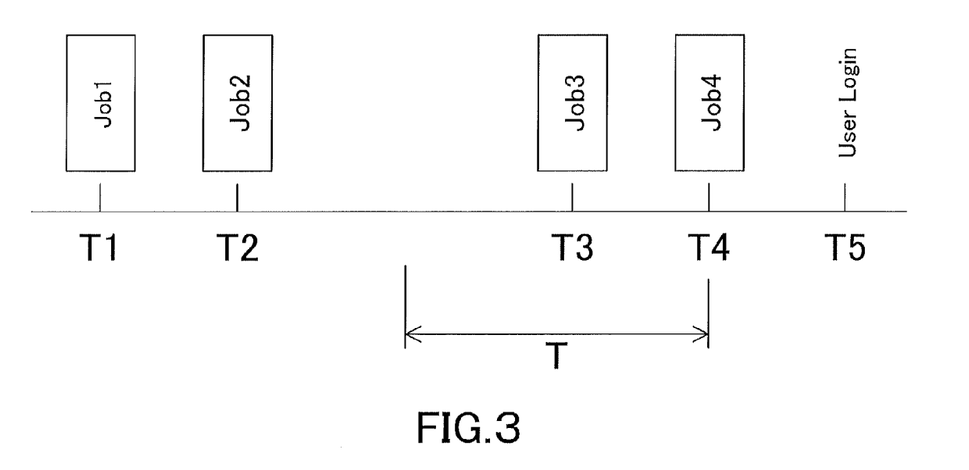
FIG. 3 is a view to explain operations of the server.

As illustrated in FIG. 3, there are four jobs 1, 2, 3, and 4 of a user, waiting in chronological order from old to new, in a spool queue stored on the memory 14 of the server 1. The jobs 1 to 4 were put into the spool queue at times T1, T2, T3, and T4, respectively.

When a user logs on to the printing apparatus 3 after putting the jobs 1 to 4 in the spool queue, the user's login information is transmitted to the server 1 from the printing apparatus 3. The login information is received by the server 1 at the time T5. The user may log on to the printing apparatus 3 by operating the operation panel. Alternatively, it is more preferable that: the user is automatically logged on to the printing apparatus 3 by touching a reader device which is capable of reading information wirelessly, with a portable recording medium such as an IC card, having his/her user information stored in advance; or the user is automatically logged on to the printing apparatus 3 by bringing the reader closer to the portable recording medium. This allows users to be automatically logged on and eventually have prints without performing any operation via the operation panel, which is user-friendly.

The server 1 judges whether or not there is a waiting job connected to the user identified by the login information, by searching the spool queue stored on the memory 14. In this example, the server 1 finds the four jobs 1 to 4 connected to the user identified by the login information.

Subsequently, the server 1 judges whether or not the times T1, T2, and T3 the jobs 1, 2, and 3 were put into the spool queue, respectively, are a predetermined period of time T or less prior to the time T4 the most recent job 4 was put into the spool queue, i.e., whether or not the gap of spool time between the most recent job 4 and any one or more of the jobs 1 to 3 is a predetermined period of time T or less. The predetermined period of time T is specified in advance by an administrator user or the user identified by the login information. In this example, the gap of spool time between the most recent job 4 and only the job 3 is the predetermined period of time T or less.

The server 1 judges that the gap between the spool times T3 and T4 is the predetermined period of time T or less; the server 1 transfers the job 3 to the printing apparatus 3 as a target job to be printed along with the most recent job 4, recognizing the job 3 as being relevant with the most recent job 4. Meanwhile the server 1 judges that the gap between the spool time T4 and the spool times T1 and T2 exceeds the predetermined period of time T; the server 1 does not transfer the jobs 1 and 2 to the printing apparatus 3, recognizing the jobs 1 and 2 to as being hardly relevant with the most recent job 4 and having been left in the spool queue because of being no longer needed.

The printing apparatus 3 performs printing in accordance with the jobs 3 and 4 received from the server 1.

Figure 4:
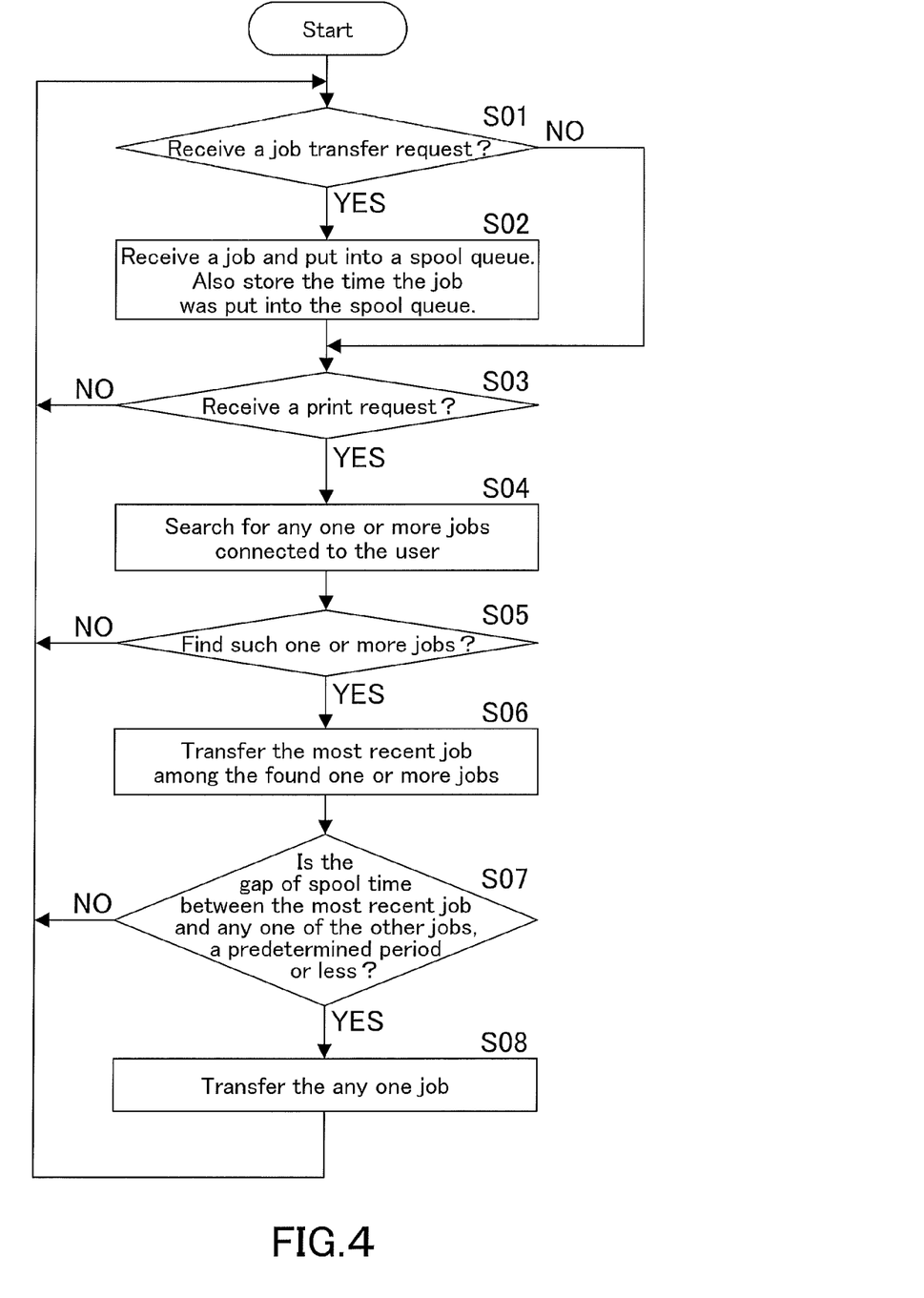
FIG. 4 is a flowchart representing the operations of the server in the embodiment of FIG. 3.
Figure 6:
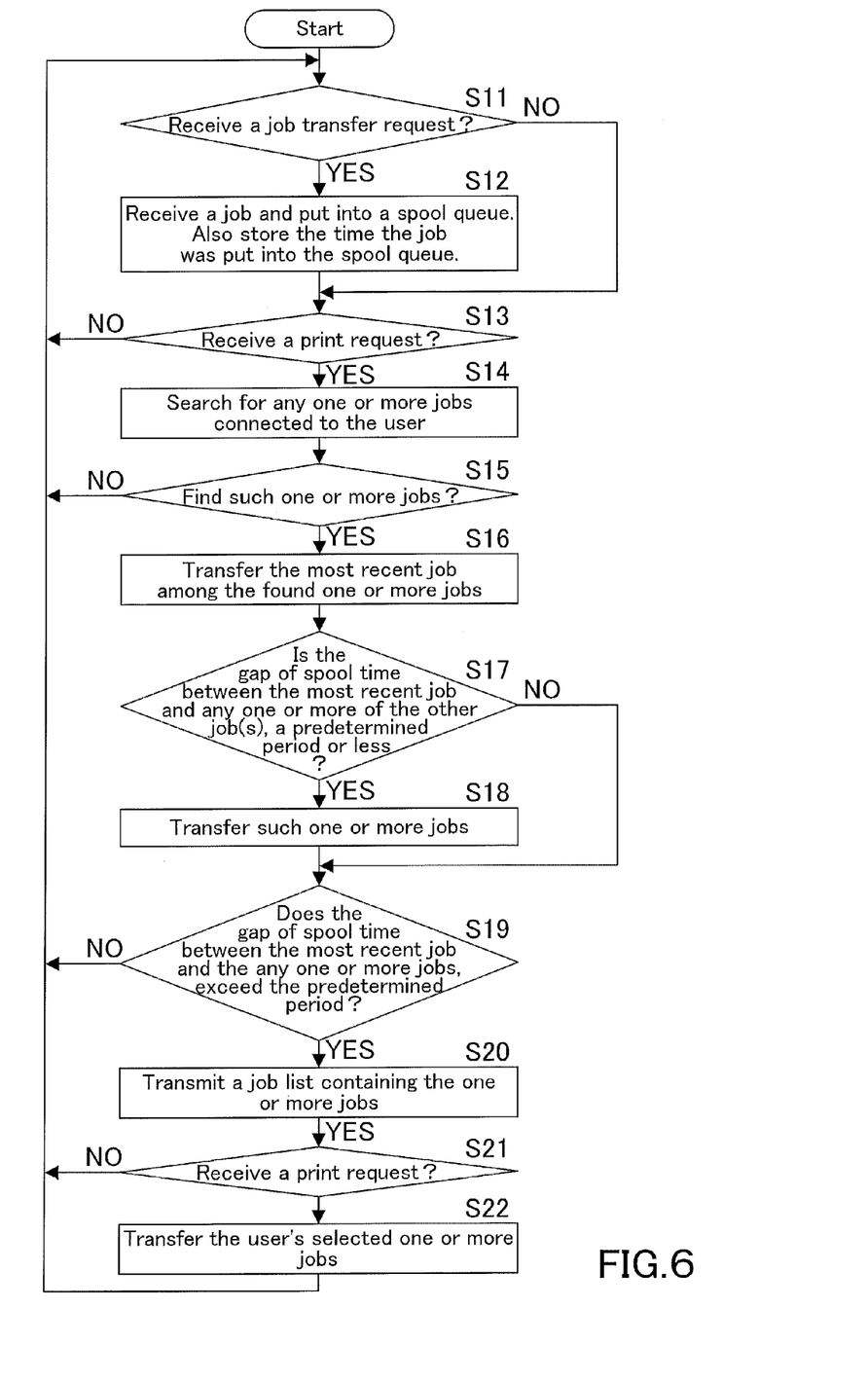
FIG. 6 is a flowchart representing the operations of the server in the embodiment of FIG. 5.
Figure 8:
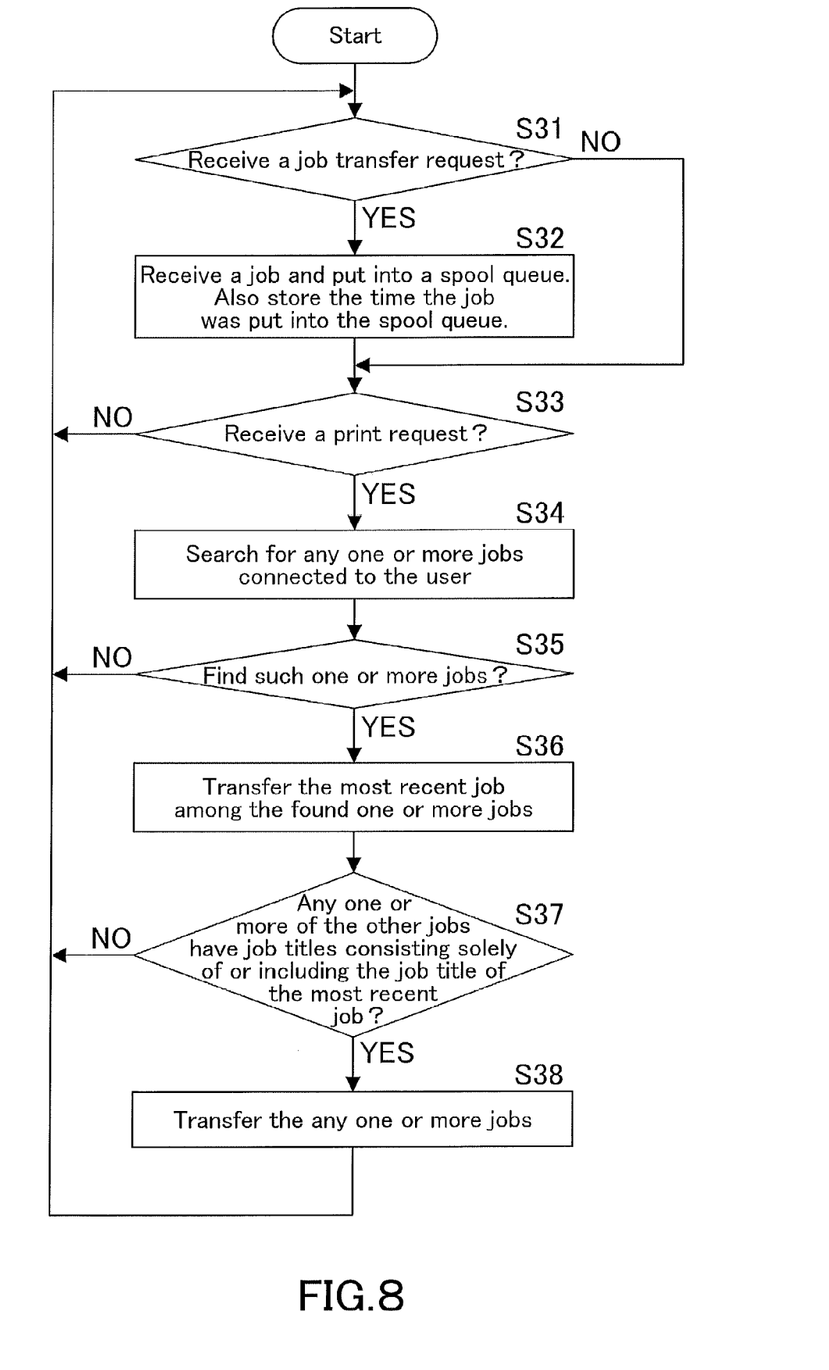
FIG. 8 is a flowchart representing the operations of the server in the embodiment of FIG. 7.
Figure 10:
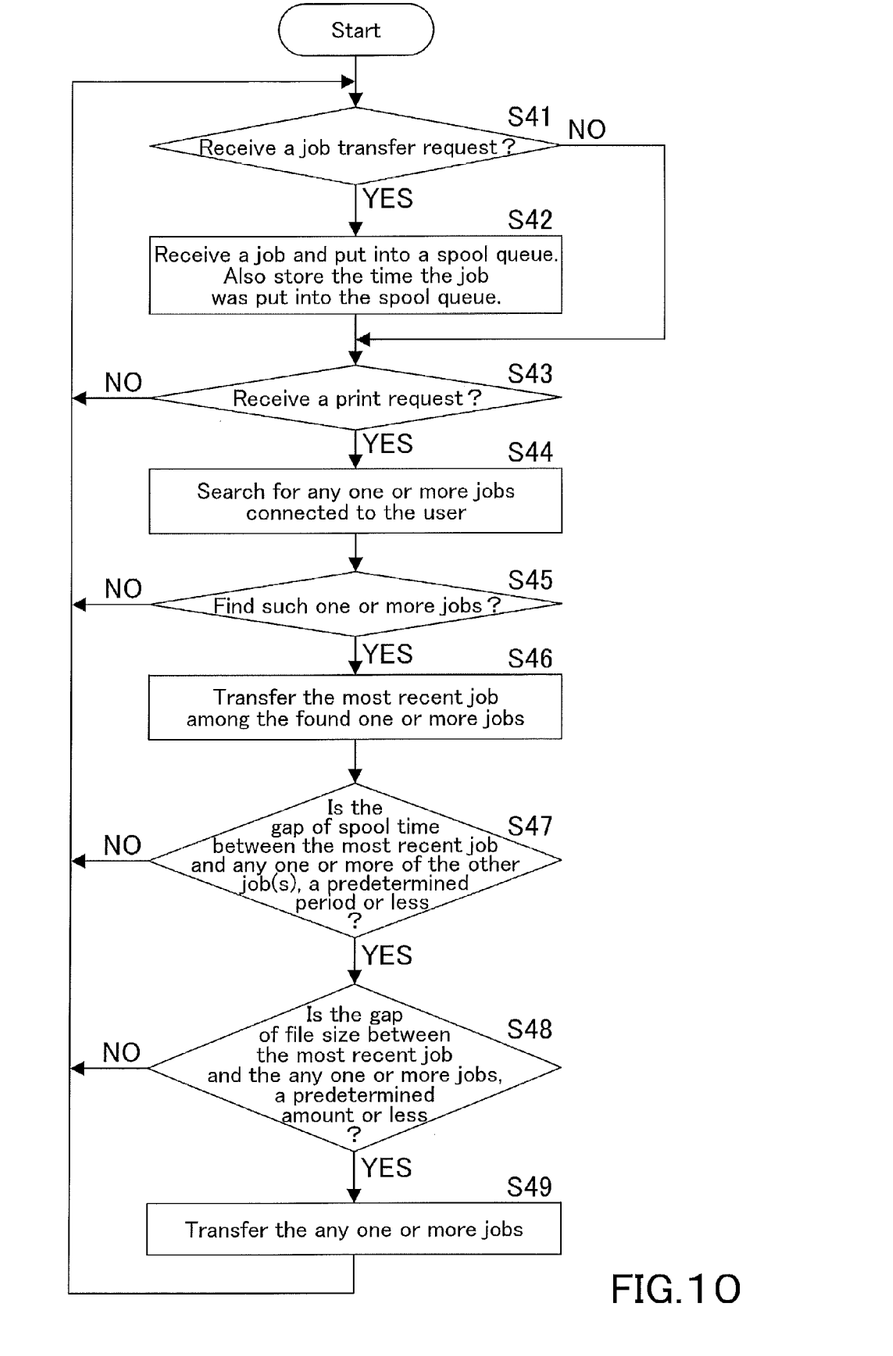
FIG. 10 is a flowchart representing the operations of the server in the embodiment of FIG. 9.

FIG. 4 is a flowchart representing the operations in the embodiment of FIG. 3 as described above. This processing routine is executed by the CPU 11 of the server 1 in accordance with an operation program stored on a recording medium of the server 1 such as the ROM 12. FIGS. 6, 8, and 10 are also flowcharts representing operations of the server 1; similarly, these processing routines are executed by the CPU 11 of the server 1 in accordance with operation programs stored on a recording medium of the server 1 such as the ROM 12.

In Step S01, it is judged whether or not a job transfer request (job spooling request) is received from the client computer 2. If a job transfer request is received (YES in Step S01), the processing routine proceeds to Step S02, in which a job is further received therefrom and put into the spool queue stored on the memory 14 while being connected to information of the user who transmitted the job transfer request. The job is further connected to the time the job was put into the spool queue. Then the processing routine proceeds to Step S03. If a job transfer request is not received (NO in Step S01), the processing routine proceeds to Step S03, directly.

In Step S03, it is judged whether or not login information is received from the printing apparatus 3, i.e., a print request is received from the printing apparatus 3. If a print request is not received (NO in Step S03), the processing routine returns to Step S01. If a print request is received (YES in Step S03), the processing routine proceeds to Step S04, in which the logon user is identified by user information included in the login information and the spool queue stored on the memory 14 is searched for any one or more jobs connected to the logon user. It is then judged in Step S05 whether or not any one or more jobs connected to the logon user are found.

If no such job is found (NO in Step S05), the processing routine returns to Step S01. If such one or more jobs are found (YES in Step S05), the most recent job among the found one or more jobs is transferred to the printing apparatus 3 in Step S06. It is then judged in Step S07 whether or not the gap of spool time between the most recent job and any one of the found one or more jobs excluding the most recent job is a predetermined period of time or less.

If the gap of spool time between the most recent job and all the found one or more jobs excluding the most recent job exceeds the predetermined period of time (NO in Step S07), the processing routine returns to Step S01. If the gap of spool time between the most recent job and any one of the found one or more jobs excluding the most recent job is a predetermined period of time or less (YES in Step S07), the any one job is transferred to the printing apparatus 3 in Step S08. The processing routine then returns to Step S01. If the gap of spool time between the most recent job and more than any one of the found more than one job excluding the most recent job is a predetermined period of time or less, the more than any one job are transferred to the printing apparatus 3.

The printing apparatus 3 performs printing in accordance with the jobs received from the server 1.

As described above, in this embodiment, if the gap of spool time between the most recent job (job 4 of FIG. 3) and any one or more of the other jobs (job 3 of FIG. 3) is a predetermined period of time or less, the any one or more jobs are transferred to the printing apparatus 3 because they seem likely to be relevant with the most recent job. Meanwhile, if the gap of spool time between the most recent job and any one or more of the other jobs (jobs 1 and 2 of FIG. 3) exceeds the predetermined period of time, the any one or more jobs are recognized as being hardly relevant with the most recent job. Therefore, the any one or more jobs are not transferred to the printing apparatus 3 in order to avoid unnecessary printing. In this way the printing apparatus 3 is allowed to execute needed jobs only, contributing to prevention of a waste of copy paper, communication time, and print time.

Furthermore, even if having been left in the spool queue because of being forgotten by the user, the most recent job in the spool queue is always transferred to the printing apparatus 3, not to a particular folder, in order to allow printing. This allows users to be free from the operation of reading it out from the folder before executing, contributing to improvement of the user operation.

Either the jobs having been transferred to the printing apparatus 3 or the jobs not having been transferred to the printing apparatus 3 may be removed from the spool queue.

In this embodiment, the most recent job is transferred to the printing apparatus 3 at a different time from another job(s) also determined to be transferred. Alternatively, the most recent job may be transferred to the printing apparatus 3 along with another job(s) also determined to be transferred.

Figure 5:
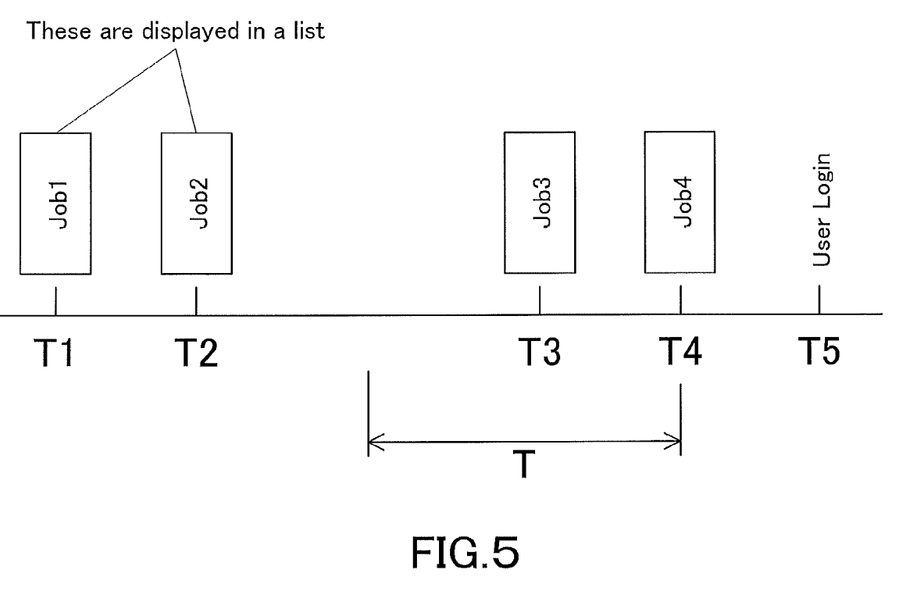
FIG. 5 is a view to explain another embodiment of the present invention.

FIG. 5 is a view to explain another embodiment of the present invention.

In the embodiment of FIGS. 3 and 4 as described above, the gap of spool time between the most recent job (job 4) and only one job (job 3) among the found one or more jobs excluding the most recent job is a predetermined period of time or less, then the only one job (job 3) is transferred to the printing apparatus 3; the gap of spool time between the most recent job (job 4) and the rest (jobs 1 and 2) of the found one or more jobs excluding the most recent job exceeds the predetermined period of time, then the jobs (jobs 1 and 2) are regarded as being no longer needed, and not transferred to the printing apparatus 3 in order to avoid unnecessary printing.

In contrast, in the embodiment to be described hereinafter, a job list containing the jobs (jobs 1 and 2) recognized as being no longer needed, is transferred to the printing apparatus 3 so that the user can confirm if he/she really does not need them anymore. And if the user gives a print request about a job from the job list, the job is transferred to the printing apparatus 3 in order to allow printing.

The job list appears on a display of the printing apparatus 3, which allows the user to select among all the not needed jobs. For the good of users, it is preferred that the job list be composed of job title at least.

FIG. 6 is a flowchart representing the operations of the server 1, to transfer a job selected by the user from the job list containing the jobs recognized as being no longer needed, to the printing apparatus 3.

In Step S11, it is judged whether or not a job transfer request is received from the client computer 2. If a job transfer request is received (YES in Step S11), the processing routine proceeds to Step S12, in which a job is further received therefrom and put into the spool queue stored on the memory 14 while being connected to information of the user who transmitted the job transfer request. The job is further connected to the time the job was put into the spool queue. Then the processing routine proceeds to Step S13. If a job transfer request is not received (NO in Step S11), the processing routine proceeds to Step S13, directly.

In Step S13, it is judged whether or not a print request is received from the printing apparatus 3. If a print request is not received (NO in Step S13), the processing routine returns to Step S11. If a print request is received (YES in Step S13), the spool queue stored on the memory 14 is searched for any one or more jobs connected to the logon user in Step S14. It is then judged in Step S15 whether or not any one or more jobs connected to the logon user are found.

If no such job is found (NO in Step S15), the processing routine returns to Step S11. If such one or more jobs are found (YES in Step S15), the most recent job among the found one or more jobs is transferred to the printing apparatus 3 in Step S16. It is then judged in Step S17 whether or not the gap of spool time between the most recent job and any one or more of the found one or more jobs excluding the most recent job is a predetermined period of time or less.

If the gap of spool time between the most recent job and any one or more of the found one or more jobs excluding the most recent job is a predetermined period of time or less (YES in Step S17), the any one or more jobs are transferred to the printing apparatus 3 in Step S18. The processing routine then returns to Step S19. If the gap of spool time between the most recent job and none of the found one or more jobs excluding the most recent job is a predetermined period of time or less (NO in Step S17), the processing routine proceeds to Step S19, directly.

In Step S19, it is judged whether or not the gap of spool time between the most recent job and the any one or more jobs exceeds the predetermined period of time. If the gap of spool time between the most recent job and the any one or more jobs do not exceed the predetermined period of time (NO in Step S19), the processing routine returns to Step S11. If the gap of spool time between the most recent job and the any one or more jobs exceeds the predetermined period of time (YES in Step S19), a job list containing the any one or more jobs is transferred to the printing apparatus 3 in Step S20. Then in Step S21, the processing routine waits until a print request about one or more jobs selected from the job list is received from the printing apparatus 3, for example for a certain period of time.

The printing apparatus 3 displays the job list received therefrom on the operation panel. When the user selects one or more jobs from the job list, a print request about the user's selected one or more jobs is transferred to the server 1 from the printing apparatus 3.

If such a print request is received (YES in Step S21), the user's selected one or more jobs are transferred to the printing apparatus 3 in Step S22. The processing routine then returns to Step S11. If such a print request is not received (NO in Step S21), the processing routine returns to Step S11.

As described above, in this embodiment, users are allowed to confirm if they really do not need anymore the jobs recognized by the server 1 as being no longer needed, contributing to the greater good of users.

Figure 7:
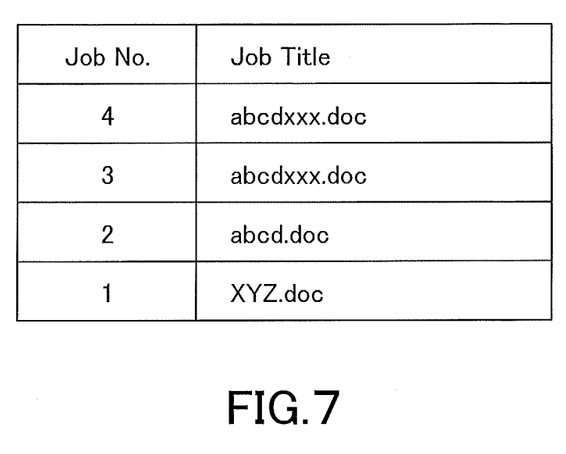
FIG. 7 is a view to explain yet another embodiment of the present invention.

FIG. 7 is a view to explain yet another embodiment of the present invention. In this embodiment, if any one or more of the jobs excluding the more recent job have job titles (file names) consisting solely of or including the job title of the most recent job, control is performed such that the any one or more jobs are not transferred to the printing apparatus 3.

For example, as illustrated in FIG. 7, the jobs 1, 2, 3, and 4, which were put into the spool queue in this order, have the following job titles (file names): "XYZ.doc", "abcd.doc", "abcdxxx.doc", and "abcdxxx.doc", respectively. The job title of the job 4 "abcdxxx.doc" includes the job title of the job 2 "abcd.doc" and also consists solely of the job title of the job 3 "abcdxxx.doc", and therefore, while the job 1 is recognized as being hardly relevant with the most recent job 4, the jobs 2 and 3 are recognized as being no longer needed. Consequently the job 1 and the most recent job 4 are transferred to the printing apparatus 3.

More specifically, if any one of the jobs excluding the most recent job has a job title consisting solely of or including the job title of the most recent job, executing the most recent job would be sufficient for the user because the any one job seems likely to be only a copy of the most recent job, the copy having been put into the spool queue with the content being amended by the user; having been put into the spool queue double for the second time by mistake with the same content; or having been put into the spool queue with the content being updated. Therefore the any one job is not transferred to the printing apparatus 3 in order to avoid unnecessary printing.

FIG. 8 is a flowchart representing the operations of the server 1, to determine whether needed or no longer needed the jobs excluding the most recent job are, on the basis of the job titles as in the embodiment of FIG. 7.

In Step S31, it is judged whether or not a job transfer request is received from the client computer 2. If a job transfer request is received (YES in Step S31), the processing routine proceeds to Step S32, in which a job is further received therefrom and put into the spool queue stored on the memory 14 while being connected to information of the user who transmitted the job transfer request. The job is further connected to the time the job was put into the spool queue. Then the processing routine proceeds to Step S33. If a job transfer request is not received (NO in Step S31), the processing routine proceeds to Step S33, directly.

In Step S33, it is judged whether or not a print request is received from the printing apparatus 3. If a print request is not received (NO in Step S33), the processing routine returns to Step S31. If a print request is received (YES in Step S33), the spool queue stored on the memory 14 is searched for any one or more jobs connected to the logon user in Step S34. In Step S35, it is judged whether or not any one or more jobs connected to the logon user are found.

If no such job is found (NO in Step S35), the processing routine returns to Step S31. If such one or more jobs are found (YES in Step S35), the most recent job among the found one or more jobs is transferred to the printing apparatus 3 in Step S36. It is then judged in Step S37 whether or not any one or more of the found one or more jobs excluding the most recent job have job titles either consisting solely of or including the job title of the most recent job.

If none of the found one or more jobs excluding the most recent job has a job title either consisting solely of or including the job title of the most recent job (NO in Step S37), the processing routine returns to Step S31. That is, if any one or more of the found one or more jobs excluding the most recent job have job titles consisting solely of or including the job title of the most recent job, the any one or more jobs are not transferred to the printing apparatus 3.

If any one or more of the found one or more jobs excluding the most recent job have job titles neither consisting solely of or including the job title of the most recent job (YES in Step S37), the any one or more jobs are transferred to the printing apparatus 3 in Step S38. The processing routine then returns to Step S31.

Similarly to the embodiment of FIG. 6, in this embodiment of FIG. 8, the server 1 may transfer a job list containing the jobs recognized as being no longer needed, to the printing apparatus 3 and further transfer a job selected by the user from the job list, to the printing apparatus 3.

If the gap of spool time between the most recent job and any one or more of the found jobs excluding the most recent job is a predetermined period of time or less in Step S07 of the flowchart of FIG. 4 or in Step S17 of the flowchart of FIG. 6, then it may be further judged in the same step whether or not the any one or more jobs have job titles consisting solely of or including the job title of the most recent job so that the server 1 will not transfer such one or more jobs to the printing apparatus 3.

With this configuration described above, if any one of the found jobs excluding the most recent job is only a copy of the most recent job, the copy having been put into the spool queue with the content being updated and a similar job title including that of the most recent job; or having been put into the spool queue double for the second time by mistake with the same content and the same job title, the server 1 is allowed to determine properly the any one job to be no longer needed, contributing to prevention of a waste of copy paper, communication time, and print time.

Figure 9:
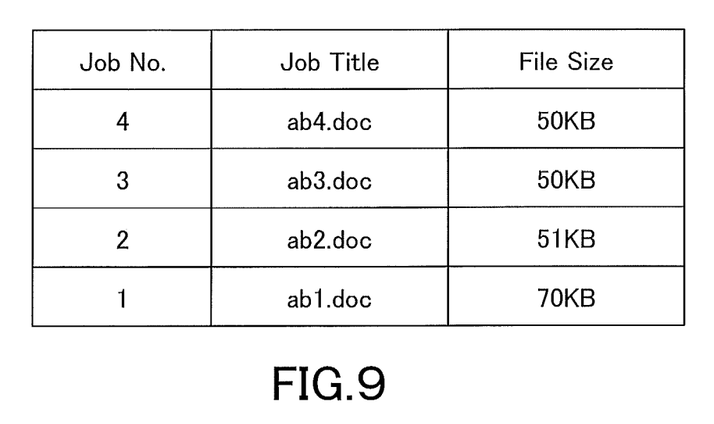
FIG. 9 is a view to explain still yet another embodiment of the present invention.

FIG. 9 is a view to explain yet another embodiment of the present invention. In this embodiment, if the gap of spool time between the most recent job and any one or more of the found jobs excluding the most recent job is a predetermined period of time or less while the gap of file size between the most recent job and the any one or more jobs is a predetermined amount or less, control is performed such that the any one or more jobs are not transferred to the printing apparatus 3.

For example, as illustrated in FIG. 9, the jobs 1, 2, 3, and 4, which were put into the spool queue in this order, have the following file size: 70, 51, 50, and 50 kilobytes, respectively. The gap of file size between the most recent job 4 and each of the files 2 and 3 is a predetermined amount or less, and therefore the jobs 2 and 3 are recognized as being no longer needed; the gap of file size between the most recent job 4 and the job 1 exceeds the predetermined amount, the job 1 is recognized as being hardly relevant with the most recent job 4. Consequently the job 1 and the most recent job 4 are transferred to the printing apparatus 3.

More specifically, if the gap of file size between the most recent job and any one of the found jobs excluding the most recent job is a predetermined amount or less, executing the most recent job would be sufficient for the user because the any one job seems likely to be only a copy of the most recent job, the copy having been put into the spool queue with the content being amended by the user or having been put into the spool queue double for the second time by mistake with the same content. Therefore the any one job is not transferred to the printing apparatus 3 in order to avoid unnecessary printing.

FIG. 10 is a flowchart representing the operations of the server 1, to determine whether needed or no longer needed the jobs excluding the most recent job are, on the basis of the file size as in the embodiment of FIG. 9.

In Step S41, it is judged whether or not a job transfer request is received from the client computer 2. If a job transfer request is received (YES in Step S41), the processing routine proceeds to Step S42, in which a job is further received therefrom and put into the spool queue stored on the memory 14 while being connected to information of the user who transmitted the job transfer request. The job is further connected to the time the job was put into the spool queue. Then the processing routine proceeds to Step S43. If a job transfer request is not received (NO in Step S41), the processing routine proceeds to Step S43, directly.

In Step S43, it is judged whether or not a print request is received from the printing apparatus 3. If a print request is not received (NO in Step S43), the processing routine returns to Step S41. If a print request is received (YES in Step S43), the spool queue stored on the memory 14 is searched for any one or more jobs connected to the logon user in Step S44. It is then judged in Step S45 whether or not any one or more jobs connected to the logon user are found.

If no such job is found (NO in Step S45), the processing routine returns to Step S41. If such one or more jobs are found (YES in Step S45), the most recent job among the found one or more jobs is transferred to the printing apparatus 3 in Step S46. It is then judged in Step S47 whether or not the gap of spool time between the most recent job and any one or more of the found one or more jobs excluding the most recent job is a predetermined period of time or less.

If the gap of spool time between the most recent job and any one or more of the found one or more jobs excluding the most recent job is a predetermined period of time or less (YES in Step S47), it is then judged in Step S48 whether or not the gap of file size between the most recent job and the any one or more jobs is a predetermined amount of less. If the gap of file size between the most recent job and the any one or more jobs is a predetermined amount or less (YES in Step S48), the processing routine returns to Step S41 without transferring the any one or more jobs to the printing apparatus 3. If the gap of file size between the most recent job and the any one or more jobs exceeds the predetermined amount (NO in Step S48), the any one or more jobs are transferred to the printing apparatus 3 in Step S49. The processing routine then returns to Step S41.

Similarly to the embodiment of FIG. 6, in this embodiment of FIG. 10, the server 1 may transfer a job list containing the jobs recognized as being no longer needed, to the printing apparatus 3 and further transfer one or more jobs selected from the job list by the user, to the printing apparatus 3.

If the found one or more jobs excluding the most recent job have job titles neither consisting solely of or including the job title of the most recent job in Step S37 of the flowchart of FIG. 8, then it may be further judged in the same step whether or not the gap of file size between the most recent job and the any one or more jobs is a predetermined amount or less, so that the server 1 will transfer such one or more jobs to the printing apparatus 3. With this configuration described above, if any one of the found jobs excluding the most recent job is a copy of the most recent job, the copy having been put into the spool queue with the content being amended by the user and a similar job title including that of the most recent job or having been put into the spool queue double for the second time by mistake with the same content and the same job title, the server 1 recognizes the any one job as being no longer needed, contributing to prevention of a waste of copy paper, communication time, and print time.

Have been described in the foregoing specification only some embodiments of the present invention, which does not mean that the present invention shall be construed as limited to the particular forms set forth herein. The present invention can be varied in many ways within the scope of the modes to be described later.

For example, the server 1 may have a configuration separate and independent from that of the printing apparatus 3 in the above-described embodiments. Alternatively, the server 1 may have a configuration including that of the printing apparatus 3.

The present invention having been described above may be applied to the following modes.

[1] A server comprising:
  a spooler which puts one or more jobs connected to one or more users in a spool queue;
  a user information receiver which receives from a printing apparatus, user information of a user who is logged on to the printing apparatus;
  a job search portion which finds one or more jobs connected to the logon user among the one or more jobs waiting in the spool queue, by using the user information received by the user information receiver; and
  a controller which controls such that the most recent job among the one or more jobs found by the job search portion is transferred to the printing apparatus and further controls, on the basis of one or both of: the job title of the most recent job; and the spool time the most recent job is put into the spool queue, such that the one or more jobs found by the job search portion, excluding the most recent job, are kept without being transferred to the printing apparatus.

[2] The server as recited in the aforementioned mode [1], wherein: if the gap of spool time between the most recent job and any one or more of the found one or more jobs excluding the most recent job is a predetermined period of time or less, the controller further controls such that the any one or more jobs is transferred to the printing apparatus; and if the gap of spool time between the most recent job and any one or more of the found one or more jobs excluding the most recent job exceeds a predetermined period of time, the controller further controls such that the any one or more jobs are kept without being transferred to the printing apparatus.

[3] The server as recited in the aforementioned mode [1], wherein if any one or more of the found one or more jobs excluding the most recent job have job titles consisting solely of or including the job title of the most recent job, the controller further controls such that the any one or more jobs are kept without being transferred to the printing apparatus.

[4] The server as recited in the aforementioned mode [2], wherein if the gap of spool time between the most recent job and any one or more of the found one or more jobs excluding the most recent job is a predetermined period of time or less while the any one or more jobs have job titles consisting solely of or including the job title of the most recent job, the controller further controls such that the any one or more jobs are kept without being transferred to the printing apparatus.

[5] The server as recited in the aforementioned mode [2], wherein if the gap of spool time between the most recent job and any one or more of the found one or more jobs excluding the most recent job is a predetermined period of time or less while the gap of file size between the most recent job and the any one or more jobs is a predetermined amount or less, the controller further controls such that the any one or more jobs are kept without being transferred to the printing apparatus.

[6] The server as recited in the aforementioned mode [3] or [4], wherein if any one or more of the found one or more jobs excluding the most recent job do not have job titles consisting solely of or including the job title of the most recent job while the gap of file size between the most recent job and the any one or more jobs is a predetermined amount or less, the controller further controls such that the any one or more jobs are kept without being transferred to the printing apparatus.

[7] The server as recited in any one of the aforementioned modes [1] to [6], wherein:
  the controller further controls such that a job list containing the found one or more jobs excluding the most recent job, the found one or more jobs being kept without being transferred to the printing apparatus, is transmitted to the printing apparatus; and
  when a notice of one or more jobs selected by a user from the job list is received from the printing apparatus, the controller further controls such that only the user's selected one or more jobs are transferred to the printing apparatus.

[8] A print job control method for a server, the print job control method comprising:
  putting one or more jobs connected to one or more users in a spool queue;
  receiving from a printing apparatus, user information of a user who is logged on to the printing apparatus;
  finding one or more jobs connected to the logon user among the one or more jobs waiting in the spool queue, by using the user information received from the printing apparatus; and
  controlling such that the most recent job among the one or more jobs found from the spool queue is transferred to the printing apparatus and further controlling, on the basis of one or both of: the job title of the most recent job; and the spool time the most recent job is put into the spool queue, such that the one or more jobs found from the spool queue, excluding the most recent job, are kept without being transferred to the printing apparatus.

[9] A non-transitory recording medium with a print job control program being stored thereon to make a computer of a server execute:

putting one or more jobs connected to one or more users in a spool queue;

receiving from a printing apparatus, user information of a user who is logged on to the printing apparatus;

finding one or more jobs connected to the logon user among the one or more jobs waiting in the spool queue, by using the user information received from the printing apparatus; and controlling such that the most recent job among the one or more jobs found from the spool queue is transferred to the printing apparatus and further controlling, on the basis of one or both of: the job title of the most recent job; and the spool time the most recent job is put into the spool queue, such that the one or more jobs found from the spool queue, excluding the most recent job, are kept without being transferred to the printing apparatus.

According to the invention as described in the aforementioned mode [1], receiving from the server, information of a user who is logged on to the printing apparatus, the server searches the spool queue for any one or more jobs connected to the user identified by the user information. Subsequently, the server transfers the most recent job among the any one or more jobs found from the spool queue, to the printing apparatus and further controls such that the rest of the found jobs is or is not transferred to the printing apparatus, on the basis of one or both of: the job title of the most recent job; and the spool time the most recent job was put into the spool queue.

In other words, the most recent job among the any one or more jobs connected to the logon user is always transferred to the printing apparatus, and also whether or not to transfer the rest of the jobs connected to the logon user is determined on the basis of the properties of the most recent job. For example, the jobs that were put in the spool queue a long time before the most recent job are recognized as being hardly relevant with the most recent job and no longer needed; the jobs having the same job title with that of the most recent job are recognized as being only copies of the most recent job, whose content has been updated, in order to avoid unnecessary printing. In this way the invention contributes to prevention of a waste of copy paper, communication time, and print time. Furthermore, even if having been left in the spool queue because of being forgotten by the user, the most recent job in the spool queue is always transferred to the printing apparatus, not to a particular folder, in order to allow printing. This allows users to be free from the operation of reading it out from the folder before executing, contributing to improvement of the user operation.

According to the invention as recited in the aforementioned mode [2], if the gap of spool time between the most recent job and any one or more of the other jobs is a predetermined period of time or less, the any one or more jobs are recognized as being relevant with the most recent job, and therefore transferred to the printing apparatus in order to allow printing. Meanwhile, if the gap of spool time between the most recent job and any one or more of the other jobs exceeds the predetermined period of time, the any one or more jobs are recognized as being hardly relevant with the most recent job, and therefore not transferred to the printing apparatus 3 in order to avoid unnecessary printing. In this way the printing apparatus executes needed jobs only, contributing to prevention of a waste of copy paper, communication time, and print time.

According to the invention as described in the aforementioned mode [3], if any or more of the other jobs have job titles consisting solely of or including the job title of the most recent job, the any or more jobs are recognized as being only copies of the most recent job, the copies having been put into the spool queue with the content being amended by the user; having been put into the spool queue double for the second time by mistake with the same content; or having been put into the spool queue with the content being updated. Therefore the any one or more jobs are not transferred to the printing apparatus in order to avoid unnecessary printing.

According to the invention as described in the aforementioned mode [4], if the gap of spool time between the most recent job and any one or more of the other jobs is a predetermined period of time or less while the any or more jobs have job titles consisting solely of or including the job title of the most recent job, the any or more jobs are recognized as being only copies of the most recent job, the copies having been put into the spool queue with the content being amended by the user; having been put into the spool queue double for the second time by mistake with the same content; or having been put into the spool queue with the content being updated. Therefore the any one or more jobs are not transferred to the printing apparatus in order to avoid unnecessary printing.

According to the invention as described in the aforementioned mode [5], if the gap of spool time between the most recent job and any one or more of the other jobs is a predetermined period of time or less while the gap of file size between the most recent job and the any one or more jobs is a predetermined amount or less, the any or more jobs are recognized as being only copies of the most recent job, the copies having been put into the spool queue with the content being amended by the user; or having been put into the spool queue double for the second time by mistake with the same content. Therefore the any one or more jobs are not transferred to the printing apparatus in order to avoid unnecessary printing.

According to the invention as described in the aforementioned mode [6], if any one or more of the other jobs do not have job titles consisting solely of or including the job title of the most recent job while the gap of file size between the most recent job and the any one or more jobs is a predetermined amount or less, the any one or more jobs are recognized as being only copies of the most recent job, the copies having been put into the spool queue with the content being amended by the user; or having been put into the spool queue double for the second time by mistake with the same content. Therefore the any one or more jobs are not transferred to the printing apparatus in order to avoid unnecessary printing.

According to the invention as described in the aforementioned mode [7], a job list containing the one or more jobs determined to be not transferred is transmitted to the printing apparatus, and a notice of one or more jobs selected by a user from the job list, which is displayed on the printing apparatus, is returned to the server, and then only the user's selected jobs are transferred to the printing apparatus in order to allow printing. That is, users are allowed to confirm if they really do not need anymore the jobs recognized by the server as being no longer needed, contributing to the greater good of users.

According to the invention as described in the aforementioned mode [8], for example, the jobs that were put in the spool queue a long time before the most recent job are recognized as being hardly relevant with the most recent job and no longer needed; the jobs having the same job title with that of the most recent job are recognized as being only copies of the most recent job, whose content has been updated, in order to avoid unnecessary printing. In this way the invention contributes to prevention of a waste of copy paper, communication time, and print time. Furthermore, even if having been left in the spool queue because of being forgotten by the user, the most recent job in the spool queue is always transferred to the printing apparatus, not to a particular folder, in order to allow printing. In this way the invention contributes to improvement of the user operation.

According to the invention as described in the aforementioned mode [9], the computer controls such that unnecessary printing is avoided, contributing to prevention of a waste of copy paper, communication time, and print time.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A server comprising:
   a hardware processor comprising a memory and configured to:
   put one or more jobs connected to one or more users in a spool queue; and
   a user information receiver which receives from a printing apparatus user information of a user who is logged on to the printing apparatus;
   the hardware processor further configured to:
   search to find one or more jobs connected to the logon user among the one or more jobs waiting in the spool queue, by using the user information received; and
   control such that the most recent job among the one or more jobs found by the search is transferred to the printing apparatus in response to a logon of the user, and further control, on the basis of one or both of: the job title of the most recent job; and the spool time the most recent job is put into the spool queue, such that a part or all of the one or more jobs found by the search, excluding the most recent job, are kept without being transferred to the printing apparatus in response to the logon of the user,
   wherein: the hardware processor is configured to control on the basis of the spool time that the most recent job is put into the spool queue, and when the gap of spool time between the most recent job and any one or more of the found one or more jobs excluding the most recent job is a predetermined period of time or less, the hardware processor is further configured to control such that the any one or more jobs is transferred to the printing apparatus; and when the gap of spool time between the most recent job and any one or more of the found one or more jobs excluding the most recent job exceeds a predetermined period of time, the hardware processor is further configured to control such that the any one or more jobs are kept without being transferred to the printing apparatus.

2. The server as recited in claim 1, wherein when the gap of spool time between the most recent job and any one or more of the found one or more jobs excluding the most recent job is a predetermined period of time or less while the any one or more jobs have job titles consisting solely of or including the job title of the most recent job, the hardware processor is further configured to control such that the any one or more jobs are kept without being transferred to the printing apparatus.

3. The server as recited in claim 1, wherein when the gap of spool time between the most recent job and any one or more of the found one or more jobs excluding the most recent job is a predetermined period of time or less while a gap of file size between the most recent job and the any one or more jobs is a predetermined amount or less, the hardware processor is further configured to control such that the any one or more jobs are kept without being transferred to the printing apparatus.

4. The server as recited in claim 1, wherein:
   the hardware processor is further configured to control such that a job list containing the found one or more jobs excluding the most recent job, the found one or more jobs being kept without being transferred to the printing apparatus, is transferred to the printing apparatus; and
   when a notice of one or more jobs selected by a user from the job list is received from the printing apparatus, the hardware processor is further configured to control such that only the user's selected one or more jobs are transferred to the printing apparatus.

5. The server as recited in claim 1, wherein the hardware processor is further configured to control such that the most recent job and a first group of jobs satisfying a predetermined condition based on a parameter of the most recent job are automatically transferred to the printing apparatus in response to the login of the user, and a second group of jobs not satisfying the predetermined condition are not automatically transferred to the printing apparatus in response to the login of the user.

6. A server comprising:
a hardware processor comprising a memory and configured to:
put one or more jobs connected to one or more users in a spool queue; and
a user information receiver which receives from a printing apparatus user information of a user who is logged on to the printing apparatus;
the hardware processor further configured to:
search to find one or more jobs connected to the logon user among the one or more jobs waiting in the spool queue, by using the user information received; and
control such that the most recent job among the one or more jobs found by the search is transferred to the printing apparatus in response to a logon of the user, and further control, on the basis of one or both of: the job title of the most recent job; and the spool time the most recent job is put into the spool queue, such that a part or all of the one or more jobs found by the search, excluding the most recent job, are kept without being transferred to the printing apparatus in response to the logon of the user,
wherein when any one or more of the found one or more jobs excluding the most recent job have job titles consisting solely of or including the job title of the most recent job, the hardware processor is further configured to control such that the any one or more jobs are kept without being transferred to the printing apparatus, and
wherein when any one or more of the found one or more jobs excluding the most recent job do not have job titles consisting solely of or including the job title of the most recent job while a gap of file size between the most recent job and the any one or more jobs is a predetermined amount or less, the hardware processor is further configured to control such that the any one or more jobs are kept without being transferred to the printing apparatus.

7. A print job control method for a server, the print job control method comprising:
putting one or more jobs connected to one or more users in a spool queue;
receiving from a printing apparatus user information of a user who is logged on to the printing apparatus;
finding one or more jobs connected to the logon user among the one or more jobs waiting in the spool queue, by using the user information received from the printing apparatus; and
the most recent job among the one or more jobs found from the spool queue is transferred to the printing apparatus in response to a logon of the user, and further controlling, on the basis of one or both of: the job title of the most recent job; and the spool time the most recent job is put into the spool queue, such that a part or all of the one or more jobs found from the spool queue, excluding the most recent job, are kept without being transferred to the printing apparatus in response to the logon of the user, and
controlling on the basis of the spool time that the most recent job is put into the spool queue, and when the gap of spool time between the most recent job and any one or more of the found one or more jobs excluding the most recent job is a predetermined period of time or less, controlling such that the any one or more jobs is transferred to the printing apparatus; and when the gap of spool time between the most recent job and any one or more of the found one or more jobs excluding the most recent job exceeds a predetermined period of time, controlling such that the any one or more jobs are kept without being transferred to the printing apparatus.

8. The print job control method as recited in claim 7, further comprising controlling such that the most recent job and a first group of jobs satisfying a predetermined condition based on a parameter of the most recent job are automatically transferred to the printing apparatus in response to the login of the user, and a second group of jobs not satisfying the predetermined condition are not automatically transferred to the printing apparatus in response to the login of the user.

9. The print job control method as recited in claim 7, wherein when the gap of spool time between the most recent job and any one or more of the found one or more jobs excluding the most recent job is a predetermined period of time or less while the any one or more jobs have job titles consisting solely of or including the job title of the most recent job, controlling such that the any one or more jobs are kept without being transferred to the printing apparatus.

10. The print job control method as recited in claim 7, wherein when the gap of spool time between the most recent job and any one or more of the found one or more jobs excluding the most recent job is a predetermined period of time or less while a gap of file size between the most recent job and the any one or more jobs is a predetermined amount or less, controlling such that the any one or more jobs are kept without being transferred to the printing apparatus.

11. A print job control method for a server, the print job control method comprising:
putting one or more jobs connected to one or more users in a spool queue;
receiving from a printing apparatus user information of a user who is logged on to the printing apparatus;
finding one or more jobs connected to the boon user among the one or more jobs waiting in the spool queue, by using the user information received from the printing apparatus; and
the most recent job among the one or more jobs found from the spool queue is transferred to the printing apparatus in response to a logon of the user, and further controlling, on the basis of one or both of: the job title of the most recent job; and the spool time the most recent job is put into the spool queue, such that a part or all of the one or more jobs found from the spool queue, excluding the most recent job, are kept without being transferred to the printing apparatus in response to the logon of the user,
wherein when any one or more of the found one or more jobs excluding the most recent job have job titles consisting solely of or including the job title of the most recent job, controlling such that the any one or more jobs are kept without being transferred to the printing apparatus, and
wherein when any one or more of the found one or more jobs excluding the most recent job do not have job titles consisting solely of or including the job title of the most recent job while a gap of file size between the most recent job and the any one or more jobs is a predetermined amount or less, controlling such that the any one or more jobs are kept without being transferred to the printing apparatus.

12. A non-transitory recording medium with a print job control program being stored thereon to make a computer of a server execute the method as recited in claim 11.

13. A non-transitory recording medium with a print job control program being stored thereon to make a computer of a server execute the method as recited in claim 7.

14. The non-transitory recording medium as recited in claim 13, wherein the print job control program makes the computer of the server execute controlling such that the most recent job and a first group of jobs satisfying a predetermined condition based on a parameter of the most recent job are automatically transferred to the printing apparatus in response to the login of the user, and a second group of jobs not satisfying the predetermined condition are not automatically transferred to the printing apparatus in response to the login of the user.

15. The non-transitory recording medium as recited in claim 13, wherein when the gap of spool time between the most recent job and any one or more of the found one or more jobs excluding the most recent job is a predetermined period of time or less while the any one or more jobs have job titles consisting solely of or including the job title of the most recent job, the print job control program makes the computer of the server execute controlling such that the any one or more jobs are kept without being transferred to the printing apparatus.

16. The non-transitory recording medium as recited in claim 13, wherein when the gap of spool time between the most recent job and any one or more of the found one or more jobs excluding the most recent job is a predetermined period of time or less while a gap of file size between the most recent job and the any one or more jobs is a predetermined amount or less, the print job control program makes the computer of the server execute controlling such that the any one or more jobs are kept without being transferred to the printing apparatus.

* * * * *